(12) United States Patent
Sakuramoto et al.

(10) Patent No.: US 11,198,180 B2
(45) Date of Patent: Dec. 14, 2021

(54) COPPER FINE PARTICLE, METHOD FOR PRODUCING SAME, AND SINTERED BODY

(71) Applicant: TAIYO NIPPON SANSO CORPORATION, Tokyo (JP)

(72) Inventors: Yuji Sakuramoto, Kawasaki (JP); Hiroshi Igarashi, Kai (JP); Takayuki Fujimoto, Kawasaki (JP)

(73) Assignee: Taiyo Nippon Sanso Corporation, Tokyo (JP)

( * ) Notice: Subject to any disclaimer, the term of this patent is extended or adjusted under 35 U.S.C. 154(b) by 0 days.

(21) Appl. No.: 16/481,855

(22) PCT Filed: Feb. 5, 2018

(86) PCT No.: PCT/JP2018/003766
§ 371 (c)(1),
(2) Date: Jul. 30, 2019

(87) PCT Pub. No.: WO2018/147214
PCT Pub. Date: Aug. 16, 2018

(65) Prior Publication Data
US 2019/0375022 A1 Dec. 12, 2019

(30) Foreign Application Priority Data
Feb. 7, 2017 (JP) .............................. JP2017-020368

(51) Int. Cl.
*B22F 1/02* (2006.01)
*B22F 9/28* (2006.01)

(52) U.S. Cl.
CPC .................. *B22F 9/28* (2013.01); *B22F 1/02* (2013.01); *B22F 2301/10* (2013.01); *B22F 2302/25* (2013.01)

(58) Field of Classification Search
CPC ...... B22F 9/28; B22F 9/22; B22F 9/12; B22F 1/02; B22F 2301/10; B22F 2302/25;
(Continued)

(56) References Cited

U.S. PATENT DOCUMENTS

| | | | |
|---|---|---|---|
| 9,248,504 B2 * | 2/2016 | Kaneshiro | B82Y 30/00 |
| 2013/0177471 A1 | 7/2013 | Kaneshiro et al. | |
| 2014/0203222 A1 * | 7/2014 | Ito | H01B 1/22 |
| | | | 252/512 |

FOREIGN PATENT DOCUMENTS

| | | |
|---|---|---|
| CN | 103480855 | 1/2014 |
| CN | 103534049 | 1/2014 |

(Continued)

OTHER PUBLICATIONS

Search Report issued in EP Appln. No. 18751250.4 dated Apr. 21, 2020.

(Continued)

*Primary Examiner* — Daniel J. Schleis
*Assistant Examiner* — Kevin CT Li
(74) *Attorney, Agent, or Firm* — Nixon & Vanderhye P.C.

(57) ABSTRACT

An object of the present invention to provide copper fine particles which can be sintered at a lower temperature than that of the conventional copper fine particles without causing a cost increase, a decrease in productivity, a method for producing the copper fine particles, and a sintered body, and the present invention provides copper fine particles having a coating film containing cuprous oxide and copper carbonate on the surface thereof.

7 Claims, 5 Drawing Sheets

(58) Field of Classification Search
CPC .. B22F 2998/10; B22F 1/0018; B22F 1/0085; B22F 1/0048
See application file for complete search history.

(56) References Cited

FOREIGN PATENT DOCUMENTS

| | | | |
|---|---|---|---|
| JP | 4304212 | | 7/2009 |
| JP | 4304221 | | 7/2009 |
| JP | 2013-041683 | | 2/2013 |
| JP | 2013-136840 | A | 7/2013 |
| JP | 2014-001443 | | 1/2014 |
| JP | 2014001443 | A * | 1/2014 |
| JP | 2014-156634 | | 8/2014 |
| JP | 5612885 | | 10/2014 |
| JP | 2015086413 | A * | 5/2015 |
| JP | 2016-006234 | | 1/2016 |
| JP | 5873471 | | 3/2016 |
| TW | I359708 | B | 3/2012 |

OTHER PUBLICATIONS

International Search Report for PCT/JP2018/003766 dated Mar. 27, 2018, 4 pages, with English Translation.
Office Action issued in CN App. No. 201880009958.3 (dated Jan. 6, 2021) (w/ translation).
"Introduction to Material Physics", Yang Shanglin, etc., Harbin Institute of Technology Press, pp. 221-222, Aug. 1999.
"Material testing technology and analysis method" Yang Yulin, etc., Harbin Institute of Technology Press, pp. 39-40, Sep. 30, 2014.
Office Action dated Jun. 16, 2021 issued in European Application No. 18751250.4 (7 pages).
Notice of Allowance dated Apr. 29, 2021 issued in Taiwanese Application No. 107104156 with partial English translation (4 pages).

* cited by examiner

C/SSA OF COPPER FINE PARTICLES(% BY MASS·g/m²)

C/SSA OF COPPER FINE PARTICLES
AFTER HEAT-PROCESSING(% BY MASS·g/m²)

COPPER FINE PARTICLE, METHOD FOR PRODUCING SAME, AND SINTERED BODY

This application is the U.S. national phase of International Application No. PCT/JP2018/003766 filed Feb. 5, 2018 which designated the U.S. and claims priority to JP Application No. 2017-020368 filed Feb. 7, 2017, the entire contents of each of which are hereby incorporated by reference.

FIELD OF THE INVENTION

The present invention relates to copper fine particles, a method for producing the same, and a sintered body.

BACKGROUND ART

In recent years, due to the advancement of performance, miniaturization, and weight reduction in electronic devices, printed wiring boards and the like used for electronic component devices, technological innovations such as high density wiring have become remarkable. Examples of material for forming such high density wiring include conductive inks and conductive pastes. These materials contain silver fine particles to impart conductivity. However, silver has problems such as high cost and easy migration. For this reason, it has been studied to use low-cost copper fine particles having conductivity equivalent to that of silver instead of silver fine particles.

However, since the copper fine particles have a high sintering temperature, for example, when using in the conductive ink or the conductive paste containing the copper fine particles in a printed wiring board or the like having a resin substrate, resin materials having low heat resistance such as PET film cannot be used. For this reason, in the case of using the conductive ink or the conductive paste containing the copper fine particles, for example, it is necessary to use a highly heat resistant material such as polyimide for the resin substrate, which causes a problem of cost increase. For this reason, as the fine particles contained in the conductive ink or the conductive paste, copper fine particles which can be applied to the resin substrate made of a material having low heat resistance such as the PET film, and which can be sintered at low temperatures have been required.

The inventors of the present invention have proposed a method for producing metal fine particles as disclosed in Patent Documents 1 and 2. Patent Documents 1 and 2 disclose a method for producing metal fine particles in which a reducing flame is formed by a burner in a furnace, metal or a metal compound as a raw material is blown into the reducing flame to heat, reduce, and evaporate.

PRIOR ART DOCUMENTS

Patent Document

Patent Document 1: Japanese Patent No. 4304212
Patent Document 2: Japanese Patent No. 4304221

SUMMARY OF INVENTION

Problems to be Solved

According to the producing methods disclosed in Patent Documents 1 and 2, the copper fine particles can be sintered at about 170° C. to 200° C. However, in the producing methods disclosed in Patent Documents 1 and 2, since carbon generated in the producing process adheres to the surface of the copper fine particles, there is a possibility that the adhered carbon component may inhibit sintering.

On the other hand, according to the producing methods disclosed in Patent Documents 1 and 2, it is also possible to produce copper fine particles having a small particle diameter (for example, about 60 nm). For this reason, it is also possible to lower the sintering temperature by controlling the particle diameter of the obtained copper fine particles to be small. However, when the particle diameter of the copper fine particles is reduced, the oxygen concentration in the copper fine particles increases with the increase of the specific surface area, which requires time for reduction, and may lower the productivity. In addition, when the particle diameter of the copper fine particles is controlled to be small, there is also a problem that the dispersibility is lowered due to the increase in the aggregation of the copper fine particles.

The present invention has been made in view of the above problems, and the present invention provides copper fine particles which can be sintered at a lower temperature than that of the conventional copper fine particles without causing a cost increase, a decrease in productivity, and the like, a method for producing the copper fine particles, and a sintered body.

Means for Solving the Problem

In order to solve the problems, the present invention provides the following copper fine particles, methods for producing the copper fine particles, and a sintered body.

In other words, the present invention provides copper fine particles having a coating film containing cuprous oxide and copper carbonate on the surface thereof.

In the copper fine particles, it is preferable that the amount of the copper carbonate in the coating film be more than 0% by mass and 20% by mass or less.

According to the present invention, the sintering temperature of the copper fine particles can be suppressed to be lower than that of the copper fine particles having the coating film containing other components by containing cuprous oxide and copper carbonate in the coating film on the surface of the copper fine particles. Furthermore, the sintering temperature can be more effectively suppressed to be lower by limiting the amount of copper carbonate in the coating film to the range above.

In the copper fine particles of the present invention, it is preferable that the ratio of a mass fraction of carbon to the specific surface area of the copper fine particles (C/SSA) be in a range of 0.008% by mass·g/m$^2$ to 0.020% by mass·g/m$^2$, and the sintering temperature be in a range of 120° C. to 150° C.

According to the present invention, the sintering temperature can be suppressed to be lower temperature in the range of 120° C. to 150° C. by limiting the ratio (C/SSA) of the mass fraction of carbon to the specific surface area of the copper fine particles to the range above.

In the present description, the specific surface area (hereinafter referred to as "SSA") of the copper fine particles means the specific surface area determined by the BET method of nitrogen adsorption. Moreover, the mass concentration (% by mass) of carbon is described as C (% by mass).

Further, the present invention provide a producing method for copper fine particles in which copper fine particles having a coating film containing cuprous oxide and copper carbonate on the surface thereof are produced by heating copper or a copper compound in a reducing flame formed in a furnace by a burner, wherein the producing method includes a heating step in which the copper fine particles having the coating film containing cuprous oxide and copper carbonate on the surface thereof are produced while controlling the ratio (C/SSA) of the mass fraction of carbon to the specific surface area of the copper fine particles by adjusting an amount of carbon in fuel gas supplied to the burner.

According to the present invention, it is possible to produce copper fine particles having the coating film containing copper carbonate on the surface thereof and having the sintering temperature lower than that of conventional copper fine particles without adhering excess carbon on the surface thereof by adjusting the amount of carbon in the fuel gas supplied to the burner, and controlling the ratio (C/SSA) of the mass fraction of carbon to the specific surface are.

Further, it is preferable that the producing method for copper fine particles according to the present invention further include a cooling step in which the copper fine particles produced in the heating step are cooled in an inert gas atmosphere.

According to the present invention, the mass fraction of carbon in the coating film can be reduced by cooling while reducing the chance of the copper fine particles coming into contact with the carbon source by the inert gas in the cooling step, and the amount of copper carbonate can be properly controlled. Thereby, it is possible to lower the sintering temperature of the obtained copper fine particles more effectively.

Furthermore, it is more preferable that the producing method for copper fine particles according to the present invention further include a post-processing step in which the copper fine particles cooled in the cooling step are heated in an inert gas atmosphere.

According to the present invention, the amount of copper carbonate can be further properly controlled without adhering excess carbon to the surface of the copper fine particles by carrying out the post-processing step, and thereby while reducing the chance that copper fine particles are in contact with the carbon source by heating in the inert gas to sublimate a part of copper carbonate. Thereby, the sintering temperature of the obtained copper particulates can be suppressed low more effectively.

The present invention also provides a sintered body in which the copper fine particles are sintered.

The sintered body of the present invention is obtained by sintering the copper fine particles of the present invention having a lower sintering temperature. Accordingly, for example, the sintered body of the present invention can be used for high density wiring on the surface of the resin substrate with low heat resistance.

In the present invention, the "amount of carbon" at the time of adjusting the carbon amount in the fuel gas supplied to the burner is the ratio of the concentration of the carbon element contained in the fuel. For example, when the fuel is a mixed gas of methane+50% hydrogen, that is, methane ($CH_4$): 1.175 $m^3$/h and hydrogen ($H_2$): 3.9 $m^3$/h, the amount of carbon is as follows.

(1.175×1)/(1.175×(1+4)+3.9×2)×100=8.6%

Further, examples of "inert gas" in the present invention include, in addition to an inert gas which is an element belonging to Group 18, a relatively inert gas such as nitrogen.

Effects of the Invention

According to the copper fine particles of the present invention, since cuprous oxide and copper carbonate are included in the coating film of the surface of the copper fine particles, it possible to suppress the sintering temperature of the copper fine particles to be a low level. As a result, it is possible to obtain copper fine particles which can be sintered at a lower temperature than that of the conventional copper fine particles without causing an increase in producing cost, a decrease in productivity, or the like. Therefore, for example, the copper fine particles of the present invention can be used for high density wiring on the surface of the resin substrate with low heat resistance and the like, and cost reduction of electronic devices, printed wiring boards and the like can be achieved.

Further, according to the producing method for copper fine particles of the present invention, it is possible to produce copper fine particles having a coating film containing copper carbonate on the surface thereof and having a sintering temperature lower than that of conventional copper fine particles without adhering excess carbon on the surface by adjusting the amount of carbon in the fuel gas supplied to the burner, and controlling the ratio (C/SSA) of the mass fraction of carbon to the specific surface of the copper fine particles.

The sintered body of the present invention is obtained by sintering the copper fine particles according to the present invention in which the sintering temperature is suppressed to be low. Therefore, for example, the sintered body of the present invention can be easily used for high density wiring on the surface of the resin substrate with low heat resistance, and the like, and cost reduction of electronic devices, printed wiring boards and the like can be achieved.

DETAILED DESCRIPTION OF THE PREFERRED EMBODIMENTS

Figure 1:
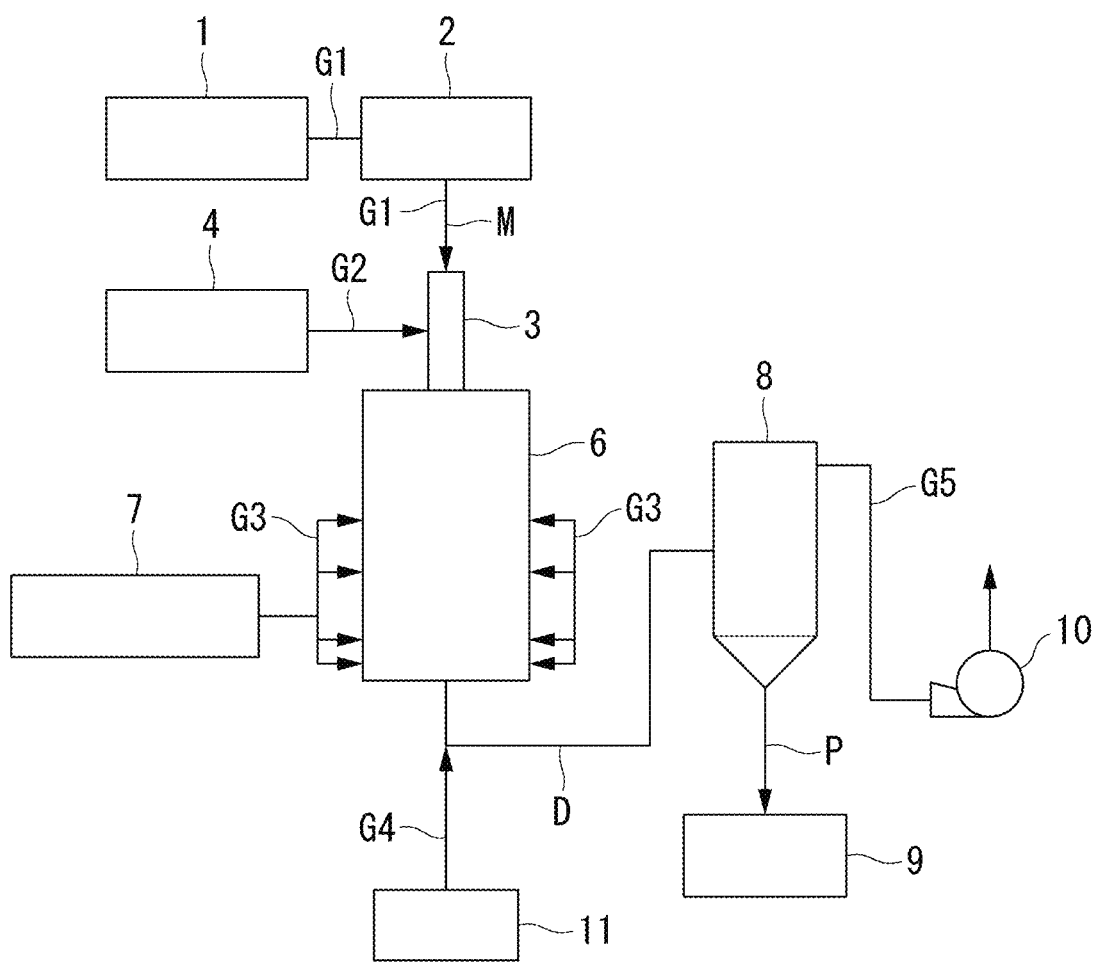
FIG. 1 is a schematic configuration view showing an example of a producing apparatus used for producing the copper fine particles according to an embodiment of the present invention.

Hereinafter, one embodiment of the copper fine particles, the producing method for the copper fine particles, and the sintered body according to the present invention will be explained with reference to FIGS. 1 to 9. In the figures used in the following description, in order to make the features easy to understand, a characteristic part may be enlarged for the sake of convenience, and the dimensional ratio of each component may not be the same as the actual one. In addition, the materials and the like in the following description are merely exemplary examples, and the present invention is not limited thereto, and can be appropriately changed and implemented without changing the gist of the invention.

<Copper Fine Particles>

The copper fine particles of the present embodiment have a coating film containing cuprous oxide and copper carbonate on the surface thereof, and are particularly characterized in that the coating film contains copper carbonate.

In general, when the surface of copper fine particles is oxidized, a film made of cuprous oxide is inevitably formed. In addition, conventional copper fine particles may have carbon adhered to the surface in producing process On the other hand, as described above, since the copper fine particles according to the present embodiment have a coating film containing cuprous oxide and copper carbonate on the surface thereof, and in particular, a certain degree of copper carbonate is contained in the coating film, the sintering temperature of the copper fine particles can be suppressed to be a lower level than that of the conventional copper fine particles as described in detail below. Thus, the sintering temperature of the copper fine particles can be suppressed to be a lower level by containing copper carbonate in the coating film. It is considered that the sintering temperature is lowered as the copper carbonate in the coating film is reduced as much as possible, since too much copper carbonate as an impurity will inhibit sintering.

In the copper fine particles of this embodiment, it is preferable that the amount of copper carbonate in the coating film be more than 0% by mass and 20% by mass or less. The effect of suppressing the sintering temperature as described above can be obtained more remarkably by setting the amount of copper carbonate in the coating film to be more than 0% by mass and 20% by mass or less and the amount of the cuprous oxide to be 80% by mass or more and less than 100% by mass in the coating film, in particular, by optimizing the proportion of copper carbonate.

Further, the amount of copper carbonate in the coating film on the surface of the copper fine particles is preferably lower within the above range, for example, more preferably more than 0% by mass to 10% by mass, and most preferably more than 0% by mass and 5% by mass or less.

Further, in the copper fine particles of the present embodiment, it is preferable that the ratio (C/SSA) of the mass fraction of carbon to the specific surface area of the copper fine particles be in a range of 0.008% by mass·g/m$^2$ to 0.020% by mass·g/m$^2$.

It is possible to limit the sintering temperature of the copper fine particles of the present embodiment to a lower temperature in a range of 120° C. to 150° C. by limiting the ratio (C/SSA) of the mass fraction of carbon to the specific surface area of the copper fine particles to within the above-mentioned range, as described in detail in Examples described later.

The thickness of the coating film on the surface of the copper fine particles is not particularly limited, and the thickness of the coating film of copper fine particles in general is about several nm.

<Producing Method of Copper Fine Particles>

The producing method for copper fine particles according to this embodiment is a method of heating copper or a copper compound in a reducing flame formed in a furnace by a burner, thereby forming copper fine particles having a coating film containing cuprous oxide and copper carbonate on the surface thereof.

The producing method of this embodiment includes a heating step in which the copper fine particles are produced while controlling the ratio (C/SSA) of the mass fraction of carbon to the specific surface area of the copper fine particles by adjusting the amount of carbon in the fuel gas supplied to the burner.

The producing apparatus used in the producing method of the copper fine particles of the present embodiment and the procedure for producing the copper fine particles will be described in detail below.

[Production Apparatus of Copper Fine Particles]

An example of the producing apparatus used by the producing method for copper fine particles of this embodiment is explained in detail below.

A producing apparatus 50 shown in FIG. 1 includes a burner 3 forming a high-temperature flame, a water cooling furnace 6 in which copper fine particles P are produced, and a recovery unit (a bag filter 8 and a recovery unit 9 in the producing apparatus shown in FIG. 1) separating and recovering gas (combustion exhaust gas G5) and powder (copper fine particles P) which are produced in the water cooling furnace 6. Specifically, the producing apparatus 50 includes a fuel supply unit 1, a feeder 2, the burner 3, a combustion supporting gas supply unit 4, the water cooling furnace 6, a first cooling gas supply unit 7, the bag filter 8, the recovery unit 9, a blower 10, and a second cooling gas supply unit 11.

The fuel supply unit 1 stores a flammable fuel gas G1 for forming a high-temperature flame, and delivers the fuel gas G1 into the feeder 2. In the present embodiment, for example, any one of methane, propane, hydrogen, and a mixed gas of methane and hydrogen can be used as the fuel gas G1.

Further, the fuel supply unit 1 can adjust the delivery amount of the fuel gas G1.

The feeder 2 quantitatively transports the powder raw material M, which is a raw material of the copper fine particles P, into the burner 3 using the fuel gas G1 as a carrier gas (gas for transfer).

The producing method of this embodiment is a method for producing the copper fine particles P, and therefore copper or a copper compound (metal compound) is used as the powder raw material M supplied from the feeder 2.

Figure 2:
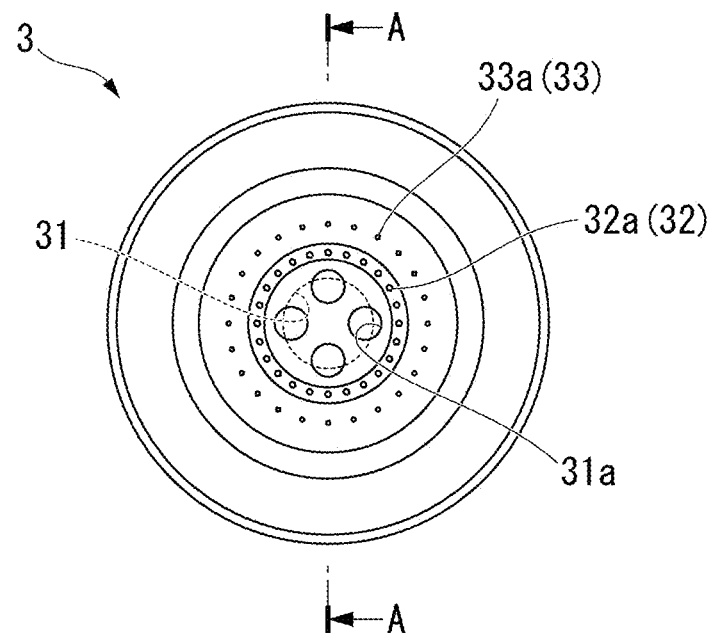
FIG. 2 is a plan view showing an example of a burner provided in the producing apparatus for copper fine particles shown in FIG. 1.
Figure 3:
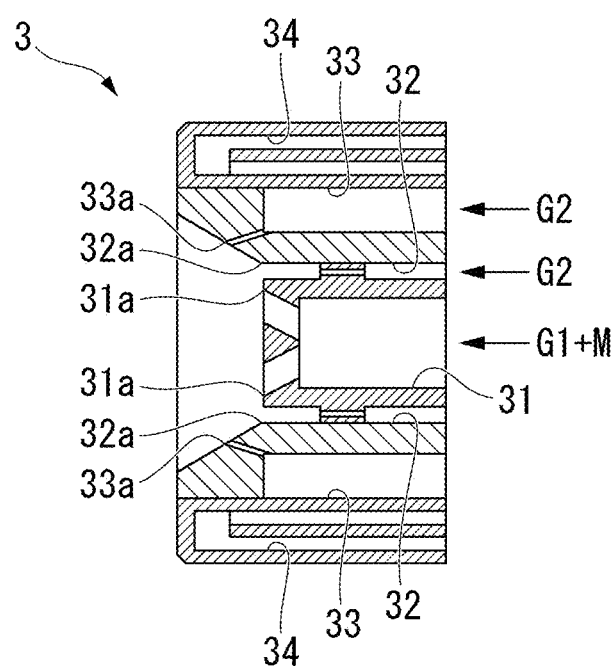
FIG. 3 is a cross-sectional view of the burner shown in FIG. 2, taken along the line A-A.

The burner 3 is attached to the upper portion of the water cooling furnace 6. The burner 3 supplies the powder raw material M into the furnace while forming a high-temperature reducing flame in the furnace by injecting the fuel gas G1 into the furnace. The burner 3 shown in FIGS. 2 and 3 is provided with a raw material ejection flow channel 31 for ejecting the powder raw material M which is a raw material of the copper fine particles P and the fuel gas G1 along the central axis thereof. Further, a primary oxygen ejection flow channel 32 which is parallel to the central axis and ejects the combustion supporting gas G2 is provided on the outer peripheral side of the raw material ejection flow channel 31. Furthermore, a secondary oxygen ejection flow channel 33 that ejects the combustion supporting gas G2 toward one point on the extension of the central axis of the burner 3 is provided coaxially on the outer peripheral side of the primary oxygen ejection flow channel 32. Furthermore, a water cooling jacket 34 is provided on the outer peripheral side of the secondary oxygen supply flow passage 33 so that the burner 3 itself can be water cooled.

In addition, as shown in FIG. 2, elliptical openings 31a are provided at four locations in the raw material ejection flow channel 31 as the flow channel tip, and the openings 31a are equally arranged on the circumference.

Further, a plurality of small diameter openings 32a are provided in the primary oxygen ejection flow channel 32 as the flow channel tip, and the plurality of openings 32a are formed equally on the circumference.

Further, a plurality of small diameter openings 33a are provided in the secondary oxygen supply flow channel 33 as the flow channel tip, and the plurality of openings 33a are formed equally on the circumference.

As shown in FIG. 3, the plurality of openings 31a which are the tip of the raw material ejection flow channel 31 are inclined in a range of approximately 5 to 45 degrees such that the central axis thereof is directed to the outer diameter side of the burner 3.

On the other hand, the plurality of openings 33a which are the tip of the secondary oxygen supply flow channel 33 are inclined in a range of approximately 5 to 45 degrees such that the central axis thereof is directed to the central axis of the burner 3.

In the burner 3, the fuel gas G1 and the powder raw material M are fed from the feeder 2 into the raw material ejection flow channel 31. Further, the combustion supporting gas (oxidant) G2 such as oxygen and oxygen-enriched air is fed from the combustion supporting gas supply unit 4 into the primary oxygen ejection flow channel 32 and the secondary oxygen supply flow channel 33 while the flow rate is adjusted individually.

Moreover, the structure of the burner 3 is not limited to what is shown in FIGS. 2 and 3, and a suitable arrangement of the nozzles, and positioning, shape, angle, number, and the like of each opening part can be employed.

The combustion supporting gas supply unit 4 supplies the combustion supporting gas G2 for stably forming a high-temperature flame into the burner 3. As described above, oxygen or oxygen-enriched air is used as the combustion supporting gas G2. Moreover, although detailed illustration is abbreviated, in order to be able to adjust the oxygen ratio in the burner 3, the combustion supporting gas supply unit 4 of this embodiment is formed so that the flow volume, and the like of the combustion supporting gas G2 can be adjusted.

The "oxygen ratio" described in the present embodiment is the ratio of oxygen when the amount of oxygen for complete combustion of the fuel gas G1 is "1".

The high-temperature reducing flame formed by the burner 3 having the above configuration is taken into the water cooling furnace 6, and the powder raw material M (in this case, copper or a copper compound as described above) transported by the fuel gas G1 is evaporated in the reducing flame, and thereby the copper fine particles with a submicron particle size are produced.

As described above, the burner 3 is attached to the upper part of the water cooling furnace 6 so that the tip (the flame forming side) of the burner 3 is directed downward.

Further, although the detailed illustration is omitted, the water cooling furnace 6 is configured such that it can cool the combustion gas inside by circulating the cooling water through the water cooling jacket provided in the peripheral wall portion, and can shut off the atmosphere in the furnace from the outside of the furnace.

The water cooling furnace 6 may be a metal furnace, but may be a furnace using a refractory wall. In this case, the combustion gas in the furnace can be cooled by taking the first cooling gas G3 such as nitrogen and argon into the furnace using a gas supply device such as a first cooling gas supply unit 7 described later. Furthermore, it is also possible to constitute the water cooling furnace 6 by a combination of a water cooling wall and a refractory wall.

The water cooling furnace 6 included in the producing apparatus 50 of the present embodiment is configured so as to be able to form a swirling flow when the first cooling gas G3 such as nitrogen and argon is introduced into the furnace from the first cooling gas supply unit 7 described later. In other words, a plurality of gas intake holes (not shown) are formed in the peripheral wall of the water cooling furnace 6 in the circumferential direction and in the height direction. The gas ejection direction of these gas intake holes is formed along the inner peripheral surface of the water cooling furnace 6. Thereby, when the first cooling gas G3 such as nitrogen and argon supplied from the first cooling gas supply unit 7 is introduced into the water cooling furnace 6, a swirling flow of the combustion gas can be produced in the furnace.

The way how to generate the swirling flow of gas in the water cooling furnace 6 is not limited to the above configuration, and, for example, it is possible to adjust the attachment position of the burner 3 to the water cooling furnace 6, the direction of the nozzle, or the shape and structure of the nozzle of the burner 3.

As described above, the first cooling gas supply unit 7 supplies the first cooling gas G3 such as nitrogen and argon to the inside of the water cooling furnace 6. Although not shown, for example, the first cooling gas supply unit 7 includes a tank which accommodates the first cooling gas G3, a blower which feeds out the first cooling gas G3 into the water cooling furnace 6, and the like.

The bag filter 8 separates the exhaust gas D discharged from the bottom of the water cooling furnace 6 into the copper fine particles P and the combustion exhaust gas G5, and collects the copper fine particles P as a product. As the bug filter 8, a filter conventionally used in this technical field can be adopted without any limitations.

The copper fine particles P collected by the bag filter 8 are sent out to the collection unit 9 for collecting and storing the copper fine particles P. On the other hand, the combustion exhaust gas G5 is sent out, for example, to an exhaust gas processing device (not shown) by the suction action of the blower 10 described later.

In the present embodiment, the configuration in which the exhaust gas D is separated into the copper fine particles P and the combustion exhaust gas G5 using the bag filter 8 is described, but the present invention is not limited thereto. For example, a cyclone, a wet dust collector, or the like can also be adopted.

As described above, the blower 10 sends (discharges) the flue gas G5 separated by the bag filter 8 to the outside of the apparatus. As such a blower 10, a general blower including a motor, a fan and the like can be used without any limitations.

Furthermore, the producing apparatus 50 illustrated in FIG. 1 includes the second cooling gas supply unit 11 which supplies the second cooling gas G4 for cooling the exhaust gas D discharged from the bottom of the water cooling furnace 6, that is, the exhaust gas D containing the copper fine particles P. The second cooling gas supply unit 11 supplies the second cooling gas G4 including, for example, air or an inert gas such as nitrogen gas and argon into the discharge pipe through which the exhaust gas D containing copper fine particles P passes. When the second cooling gas G4 is an inert gas, the exhaust pipe can be brought into a state close to an inert gas atmosphere. This allows the copper fine particles P to be cooled while reducing the chance of the copper fine particles P coming into contact with the carbon source.

Furthermore, although not shown in FIG. 1, the producing apparatus 50 may be further provided with a post-heating processing unit in a channel between the second cooling gas supply unit 11 and the bag filter 8. In the post-heating processing unit, the cooled copper fine particles P (exhaust gas D) are further heat-treated in the inert gas which is the second cooling gas G4 supplied from the second cooling gas supply unit 11. That is, the post-heating processing unit performs the heating processing while reducing the chance of the copper fine particles P coming into contact with the carbon source by the inert gas.

For example, a batch type heater equipped with a heater not shown in figures may be used as the post-heating processing unit, and heating processing may be subjected to the copper fine particles P each time in the course of producing apparatus 50. Such a batch-type post-heating processing unit can control the internal atmosphere by the gas to be introduced.

Furthermore, a stirring mechanism may be provided in the processing furnace of the post-heating processing unit. In addition, the heating processing may be performed continuously by providing a transport mechanism such as a conveyor. Moreover, it is not specifically limited as a heating method in the post-heating processing unit. For example, a method using a flame such as a burner may be used, or a method in which a heated gas is introduced into the processing furnace may be used. When the burner is used, it is preferable to use the indirect heating system from the viewpoint of controlling the inside of the processing furnace to be an inert atmosphere.

[Production of Copper Fine Particles]

The method of producing the copper fine particles P using the above-mentioned producing apparatus 50 will be described in detail below.

As described above, the producing method of this embodiment is a method for producing the copper fine particles having the coating film containing cuprous oxide and copper carbonate on the surface thereof by heating copper or the copper compound in the reducing flame formed in the water cooling furnace 6 by the burner 3. The producing method of this embodiment includes the heating step in which the copper fine particles P are produced while controlling the ratio (C/SSA) of the mass fraction of carbon to the specific surface area of the copper fine particles by adjusting the amount of carbon in the fuel gas supplied to the burner.

In order to produce copper fine particles P using the producing apparatus 50, first, the fuel gas G1 is fed into the raw material ejection flow channel 31 of the burner 3 while conveying the powder raw material M in the feeder 2 by feeding the fuel gas G1 from the feeder 2 into the raw material ejection flow channel 31 in the heating step. Further, at the same time, the combustion supporting gas G2 (oxygen) is fed from the combustion supporting gas supply unit 4 into the primary oxygen ejection flow channel 32 and the secondary oxygen ejection flow channel 33 of the burner 3, and combusted so as to form a high-temperature reducing flame by the burner 3 in the water cooling furnace 6.

Further, in the heating step, the cooling water is supplied to a water cooling jacket not shown in figures provided in the water cooling furnace 6 to quench the atmosphere in the furnace, whereby it is possible to suppress that the produced copper fine particles P collide with each other and fuse to increase in diameter of the copper fine particles P.

Furthermore, in the heating step, it is possible to suppress that the copper fine particles P are combined to increase in diameter while the shape of the produced copper fine particles is spherically controlled by forming the swirling flow of the first cooling gas G3 supplied from the first cooling gas supply unit 7 in the water cooling furnace 6.

In the heating step, it is preferable to appropriately adjust the amount of the combustion supporting gas supplied from the combustion supporting gas supply unit 4 to the burner 3, that is, the amount of oxygen while taking into consideration the amount of oxygen in the reducing atmosphere.

In the heating step of this embodiment, as described above, the copper fine particles P are produced while controlling the ratio (C/SSA) of the mass fraction of carbon to the specific surface area of the copper fine particles by adjusting the amount of carbon in the fuel gas G1 supplied to the burner 3. At this time, it is more preferably to adjust the amount of carbon in the fuel gas G1 such that the ratio of the mass fraction of carbon to the specific surface area of the copper fine particles (C/SSA) be in the range of 0.008 to 0.020% by mass g/m$^2$. More specifically, for example, the carbon amount in the fuel gas G1 can be adjusted by adjusting the composition in the fuel gas G1 containing methane, propane, or a mixed gas of methane and hydrogen, and the overall supply amount.

It is possible to limit the sintering temperature of the produced copper fine particles P to be lower temperature in the range of, for example, 120 to 150° C. by such an adjustment.

Further, in the present embodiment, a powder of copper (metal copper) or a copper compound (for example, copper oxide or the like) is used as the powder raw material M supplied from the feeder 2. However, the diameter of the powder raw material M is not particularly limited. However, from the viewpoint of optimizing the ratio of the mass fraction of carbon (C/SSA) by adjusting the specific surface area of the copper fine particles described above, it is preferable to use the powder raw material M having an average particle diameter in a range of 1 μm to 50 μm.

In addition, the average particle diameter of the copper compound demonstrated by this embodiment means the value of "D50" obtained by particle size distribution measurement.

Moreover, as the powder raw material M used in this embodiment, other than the above, for example, any materials such as copper nitrate, and copper hydroxide can be used as long as copper oxide can be produced by heating, and it is a high purity material.

The copper powder or the copper compound powder introduced into the reducing flame by the burner 3 becomes the copper fine particles P having a particle size of submicron or less which is smaller than that of the powder raw material M by heating, evaporation, and reduction. In addition, the coating film containing cuprous oxide and copper carbonate is formed on the surface of the copper fine particles P produced in the heating step.

Then, the copper fine particles P produced in the water cooling furnace 6 in the heating step are taken out from the bottom of the water cooling furnace 6 as the exhaust gas D together with the combustion exhaust gas G5, and introduced into the bag filter 8. Then, the copper fine particles P caught by the bag filter 8 are collected and stored in the collection unit 9. At this time, the copper fine particles P caught by the bag filter 8 can be made into the copper file particles P having a desired particle size distribution as a product by further classifying using a classification device not shown in figures. At this time, the remaining copper fine particles (mostly, copper fine particles having a large particle size) after classification can be recovered and used again as a powder material.

According to the producing method of the present embodiment, as described above, it is possible to produce the copper fine particles P having the coating film containing copper carbonate on the surface thereof and a lower sintering temperature than the conventional sintering temperature with high productivity without adhering excess carbon on the surface by adjusting the amount of carbon in the fuel gas G1 supplied to the burner 3 to control the ratio (C/SSA) of the mass fraction of carbon to the specific surface area.

The production method of the present embodiment further includes a cooling step in which the copper fine particles P produced in the heating step using the water cooling furnace 6 or the like are cooled in the second cooling gas G4 atmosphere using the second cooling gas supply unit 11. Thus, the production method in the present embodiment includes the heating step and the cooling step subsequent to the heating step, and the copper fine particles P (exhaust gas D) are cooled by the second cooling gas G4. In particular, when the second cooling gas G4 is an inert gas, the mass fraction of carbon in the coating film of copper fine particles P can be more effectively reduced. This makes it possible to lower the sintering temperature of the produced copper fine particles P more effectively.

In addition to air, an inert gas such as nitrogen, and argon is used as the second cooling gas G4 supplied from the second cooling gas supply unit 11. Further, the exhaust gas D taken out of the water cooling furnace 6 has a temperature of approximately 200° C. to 700° C., but it is preferable to adjust the supply amount of the second cooling gas G4 so as to cool to 100° C. or less.

Moreover, as described above, it is preferable that the producing method of the present embodiment further include the post-processing step in which the copper fine particles P (exhaust gas D) cooled in the cooling step using the second cooling gas supply unit 11 are heated in an inert gas atmosphere using a post-heating processing unit not shown in figures. The amount of copper carbonate can be controlled within an appropriate range by providing the post-processing step following the heating step and the cooling step, subjecting to the heating processing while preventing the copper fine particles P from coming into contact with the carbon source, and sublimating a part of the copper carbonate. Thereby, it possible to lower the sintering temperature of the produced copper fine particles P more effectively, as described above.

As an inert gas used in the post-processing step, for example, nitrogen, argon, and the like can be used.

The heating processing temperature in the post-processing step is not particularly limited, but is preferably in a range of 150° C. to 400° C., for example.

The heating processing time in the post-processing step varies depending on the heating processing temperature, but may be, for example, in a range of 10 minutes to 240 minutes (4 hours). If the heating processing time is less than 10 minutes, the effect of the heating processing cannot be sufficiently obtained. If it is more than 4 hours, the obtained effect does not change.

In the present embodiment, an example is described in which the fuel gas G1 and the powder raw material M are both introduced into the burner 3 using the fuel gas G1 as a carrier gas, but the invention is not limited thereto. For example, the powder raw material M may be directly blown from a portion other than the burner into the reducing flame formed by the burner. Alternatively, the powder raw material M may be separately fed into the burner using a gas (for example, air, and the like) other than the fuel as a carrier gas.

In addition to the fuel gas, for example, hydrocarbon fuel oil can be used as the fuel for forming the reducing flame. In this case, it is preferable that the powdery raw material be directly blown into the reducing flame from a portion other than the burner.

<Sintered Body>

Although not shown in figures, the sintered body of the present embodiment is obtained by sintering the copper fine particles of the present embodiment having the above configuration.

As described above, the copper fine particles of the present embodiment have a low sintering temperature. Therefore, the sintered body of the present embodiment, in which such copper fine particles are sintered, can be applied to, for example, high density wiring on the surface of a resin substrate with low heat resistance. Therefore, the cost of the electronic device and the printed wiring board can be further reduced.

<Function and Effect>

As described above, according to the copper fine particles of the present embodiment, the sintering temperature of the copper fine particles can be reduced by including cuprous oxide and copper carbonate in the coating film of the surface of copper fine particles. Thereby, the copper fine particles can be provided which can be sintered at a temperature lower than that of the prior art without causing an increase in manufacturing cost, a decrease in productivity and the like. Therefore, for example, the copper fine particles of the present invention can be applied to high density wiring and the like on the surface of the resin substrate with low heat resistance, and cost reduction of an electronic device, a printed wiring board and the like can be achieved.

Further, the producing method of the copper fine particles in the present embodiment includes the heating step in which the ratio (C/SSA) of the mass fraction of carbon to the specific surface area of the copper fine particles is controlled by adjusting the amount of carbon in the fuel gas G1 supplied to the burner 3. Thereby, it possible to produce the copper fine particles P having the coating film containing copper carbonate on the surface and having a lower sintering temperature than a conventional sintering temperature without adhering excessive carbon on the surface.

Further, according to the sintered body of the present embodiment, since the copper fine particles according to the present embodiment in which the sintering temperature is suppressed to be a low level are sintered, the sintered body can be used for high density wiring on the surface of the resin substrate with low heat resistance and the like, and the cost of electronic devices and printed wiring boards can be reduced.

EXAMPLE

Hereinafter, the copper fine particles, the producing method thereof, and the sintered body according to the present invention will be described in more detail by Examples, but the present invention is not limited thereto.

Examples 1 to 11

In Examples 1 to 11, the copper fine particles P were produced by the procedure described below using the producing apparatus 50 (including the burner 3 shown in FIGS. 2 and 3) under the conditions shown in the following Tables 1 and 2.

In Examples 1 to 11, propane having an amount of carbon as shown in Table 2 below was used as the fuel gas G1 supplied to the burner 3. Specifically, in Examples 1 to 11, the amount of carbon in the fuel gas G1 was adjusted by using any one of combustible gases, such as methane, propane, and a mixed gas of methane and hydrogen (methane+50% hydrogen and methane+75% hydrogen) as the fuel gas G1 and changing the composition. For example, the methane+50% hydrogen and the methane+75% hydrogen used as the fuel gas G1 was a mixed fuel of methane and hydrogen in which 50% or 75% of hydrogen is added relative to 100% of methane based on the lower heating value (see Table 1 below).

Further, oxygen was used as the combustion supporting gas G2 supplied from the combustion supporting gas supply unit 4, and the oxygen ratio was adjusted to be the ratio shown in Table 1 below.

In addition, nitrogen was used as the first cooling gas G3 which forms the swirl flow in the furnace and was supplied from the first cooling gas supply unit 7 into the water cooling furnace 6.

Further, air or nitrogen which is an inert gas was used as the second cooling gas G4 supplied from the second cooling gas supply unit 11.

Further, the copper fine particles P were recovered by catching the exhaust gas D cooled in the cooling step of the water cooling passage 6, and collecting by the collection unit 9 in Examples 1 to 11.

In Examples 1 to 11, copper oxide (I) powder having an average particle diameter of 10 μm was used as the powder raw material M which is a raw material.

Here, as shown in Table 1 below, the oxygen ratio and the raw material supply rate at the time of supplying the combustion supporting gas G2 into the burner 3 were adjusted in a range determined on the basis of the lower heating value of the supplied fuel.

In Examples 1 to 11, the copper oxide (I) powder transported by the fuel gas G1 was evaporated in the high-temperature reducing flame formed by the burner 3 in the water cooling furnace 6 to produce the copper fine particles P having a submicron size diameter under the above conditions.

The copper fine particles P obtained in Examples 1 to 11 were analyzed by X-ray photoelectron spectroscopy (XPS) to measure the contents of cuprous oxide and copper carbonate contained in the produced copper fine particles P (in the coating film on the surface). The measurement results are shown in Table 2 below.

Figure 4:
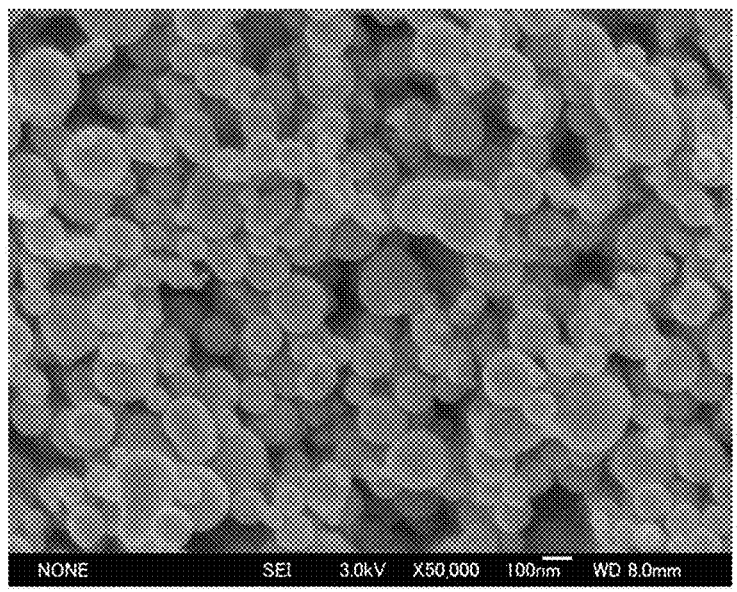
FIG. 4 is a photograph of the copper fine particles produced in Example as observed with a scanning electron microscope (SEM).

The scanning electron microscope (SEM) photograph of the copper fine particles P obtained in Example 11 is shown in FIG. 4. As shown in FIG. 4, it can be understood that the copper fine particles P obtained in Example 11 are produced as particles having a good shape without fusion of each of the copper fine particles.

Next, 2-propanol was added to the copper fine particles obtained in Examples 1 to 11 so that the weight ratio of the copper fine particles be 63% by mass, and stirred using a commercially available kneader (Shinky Co., Ltd.: Awatori Neritaro) under the conditions in which the rotation speed is 2,000 rpm and the rotation time is 1 minute) to produce a paste.

Next, the produced paste was applied to a glass substrate, and was sintered for 1 hour at a constant temperature in a reducing atmosphere in which 3% by volume of hydrogen was added to 100% by volume of nitrogen. Then, the specific resistance of the obtained sintered body was measured by the four-terminal method. The temperature at which this specific resistance became 100 μΩ·cm or less was regarded as the sintering temperature of the copper fine particles P.

Figure 5:
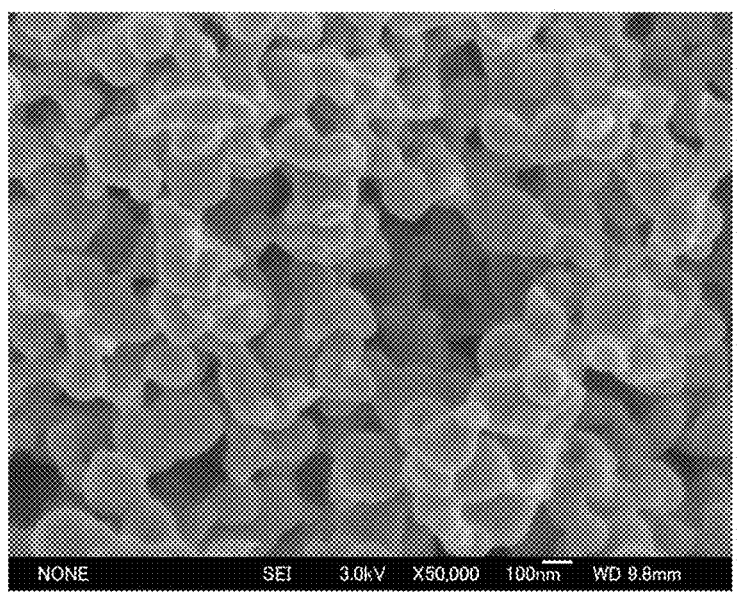
FIG. 5 is a photograph of the sintered body of copper fine particles produced in Example as observed with a scanning electron microscope (SEM).

The SEM photograph of the sintered body after sintering the copper fine particles P obtained in Example 11 is shown in FIG. 5. As shown in FIG. 5, it can be understood that the sintered body obtained by sintering the copper fine particles P obtained in Example 11 is in a state in which each of the copper fine particles is favorably sintered.

Table 1 below shows the lower heating value of the supplied fuel, the oxygen ratio at the time of supplying the combustion supporting gas G2 determined based on the lower heating value, and the raw material supply rate. Further, Table 2 below also shows the production conditions of the copper fine particles, the physical properties of the obtained copper fine particles, and the sintering temperature (including the specific resistance) in Examples 1 to 11.

TABLE 1

| Lower heating value of supplied fuel (kJ/h) | Oxygen ratio of combustion supporting gas (—) | Raw material supply rate (kg/h) |
| --- | --- | --- |
| 84,108 | 0.6 to 0.9 | 0.2 to 0.4 |

TABLE 2

| | Production conditions | | | |
| --- | --- | --- | --- | --- |
| | Fuel gas | C element concentration in fuel gas atom % | Cooling gas | Oxygen ratio |
| Example 1 | propane | 27.27 | air | 0.9 |
| Example 2 | methane + 50% hydrogen | 8.59 | air | 0.9 |
| Example 3 | methane + 75% hydrogen | 4.01 | air | 0.9 |
| Example 4 | methane | 20.00 | air | 0.9 |
| Example 5 | methane | 20.00 | air | 0.9 |
| Example 6 | hydrogen | 0.00 | air | 0.9 |
| Example 7 | methane + 50% hydrogen | 8.59 | air | 0.8 |

TABLE 2-continued

| | | | | | |
|---|---|---|---|---|---|
| Example 8 | methane + 50% hydrogen | 8.59 | air | 0.7 |
| Example 9 | methane + 50% hydrogen | 8.59 | air | 0.6 |
| Example 10 | hydrogen | 0.00 | nitrogen | 0.9 |
| Example 11 | hydrogen | 0.00 | nitrogen | 0.9 |

| | | | Coating film sintering conditions | | | | |
|---|---|---|---|---|---|---|---|
| | | | Carbon concentration | Mass fraction of carbon/specific surface | XPS analysis | | Coating film sintering conditions |
| | Specific surface area (SSA) $m^2/g$ | Average particle diameter nm | (C element concentration) % by mass | area of copper fine particles (C/SSA) mass·$g/m^2$ | Copper carbonate ($CuCO_3$) % by mass | Cuprous oxide ($Cu_2O$) % by mass | Sintering temperature °C | Specific resistance $\mu\Omega \cdot cm$ |
| Example 1 | 6.132 | 110 | 0.182 | 0.030 | 24.0 | 76.0 | 180 | 58 |
| Example 2 | 5.972 | 113 | 0.105 | 0.018 | 18.2 | 81.8 | 150 | 78 |
| Example 3 | 5.983 | 113 | 0.096 | 0.016 | 16.3 | 83.7 | 140 | 68 |
| Example 4 | 6.002 | 112 | 0.160 | 0.027 | 21.6 | 78.4 | 170 | 72 |
| Example 5 | 11.620 | 58 | 0.222 | 0.019 | 17.4 | 82.6 | 150 | 79 |
| Example 6 | 5.587 | 121 | 0.063 | 0.011 | 13.3 | 86.7 | 130 | 52 |
| Example 7 | 5.751 | 117 | 0.133 | 0.023 | 21.8 | 78.2 | 170 | 59 |
| Example 8 | 5.568 | 121 | 0.211 | 0.038 | 24.8 | 75.2 | 180 | 67 |
| Example 9 | 5.381 | 125 | 0.265 | 0.049 | 29.8 | 70.2 | 200 | 83 |
| Example 10 | 4.773 | 141 | 0.035 | 0.007 | 10.6 | 89.4 | 120 | 64 |
| Example 11 | 6.013 | 112 | 0.030 | 0.005 | 6.20 | 93.8 | 120 | 81 |

As shown in Table 2, it can be confirmed that the concentration of copper carbonate contained in the coating film on the surface of the obtained copper fine particles P can be controlled by changing the composition of the fuel gas G1 and adjusting the amount of carbon contained in the fuel gas G1.

Figure 6:
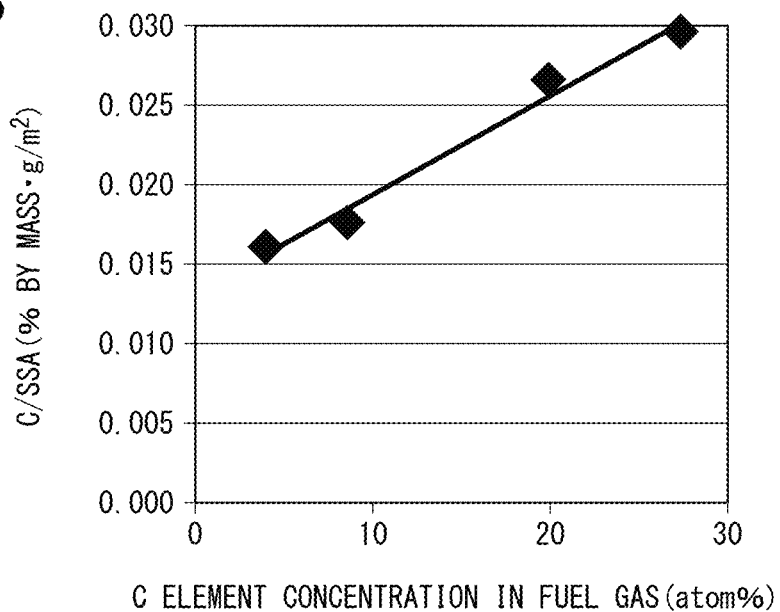
FIG. 6 is a graph showing a relationship between the amount of carbon contained in fuel gas supplied to the burner and the ratio (C/SSA) of the mass fraction of carbon to the specific surface area of the copper fine particles in Example.

FIG. 6 shows the relationship between the amount of carbon contained in the fuel gas G1 supplied to the burner 3 and the ratio (C/SSA) of the mass fraction of carbon to the specific surface area of the copper fine particles in Examples 1 to 4. From the results shown in FIG. 6, it can be confirmed that the mass fraction of carbon in the coating film decreases and the C/SSA decreases as the amount of carbon in the fuel gas G1 decreases.

Figure 7:
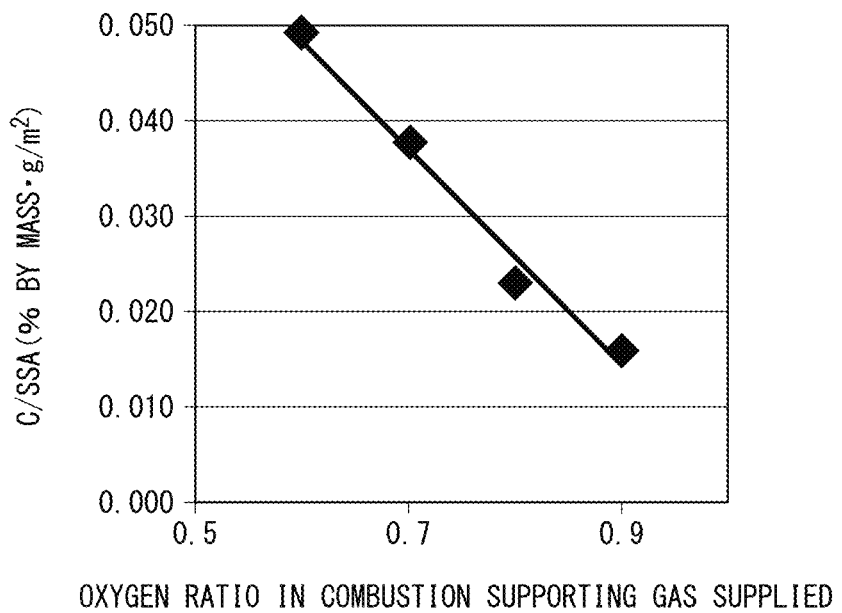
FIG. 7 is a graph showing a relationship between the oxygen ratio and the ratio (C/SSA) of the mass fraction of carbon to the specific surface area of the copper fine particles when a combustion supporting gas is supplied to the burner in Example.

FIG. 7 shows the relationship between the oxygen ratio when the combustion supporting gas G2 is supplied to the burner 3 and the ratio (C/SSA) of the mass fraction of carbon to the specific surface area of the copper fine particles in Examples 2 and 7 to 9. As shown in FIG. 7, it is confirmed that when a mixed gas of methane and hydrogen (methane+ 50% hydrogen) is used as the fuel gas G1, the mass fraction of carbon decreases and the C/SSA increases as the oxygen ratio by the combustion supporting gas G2 decreases. Therefore, according to the results of Examples 2 and 7 to 9, even if the fuel gas G1 is the same fuel type, it is possible to control the C/SSA by adjusting the supply ratio of the combustion supporting gas G2 and adjusting the oxygen ratio.

As shown in Table 2, in the copper fine particles obtained in Examples 1 to 11, the ratio (C/SSA) of the mass fraction of carbon to the specific surface area of the fine copper fine particles decreases as the mass percentage of copper carbonate decreases, that is, the mass fraction of carbon in the coating film on the surface of the fine copper fine particles decreases.

Figure 8:
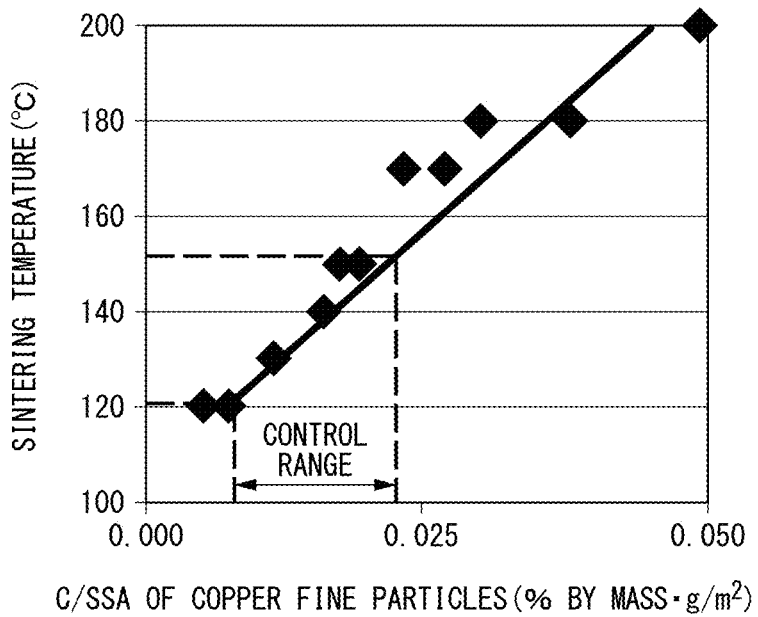
FIG. 8 is a graph showing the relationship between the sintering temperature and the ratio (C/SSA) of the mass fraction of carbon to the specific surface area of the copper fine particles when sintering the copper fine particles in Examples.

FIG. 8 shows the relationship between the sintering temperature when sintering the copper fine particles obtained in Examples 1 to 11 and the ratio (C/SSA) of the mass fraction of carbon to the specific surface area of the copper fine particles. From the results shown in FIG. 8, it is confirmed that the sintering temperature decreases as the C/SSA decreases. Furthermore, it is also confirmed that as the C/SSA decreases, the sintering temperature also decreases, and when the C/SSA is 0.020% by mass·$g/m^2$ or less, the sintering temperature becomes 150° C. or less. Furthermore, it is also confirmed that when the C/SSA is less than 0.008% by mass·$g/m^2$, the sintering temperature does not change, and when the C/SSA is in a range of 0.008% by mass·$g/m^2$ to 0.020% by mass·$g/m^2$, the sintering temperature can be controlled in a range of 120° C. to 150° C. Therefore, according to the results of Examples 1 to 11, it is clear that the concentration of copper carbonate contained in the coating film on the surface of the copper fine particles produced can be controlled by adjusting the amount of carbon in the fuel gas G1 and using an inert gas as the second cooling gas G4. In addition, it is clear from the results of Examples 1 to 11 that sintering can be performed at a low temperature by making the concentration of copper carbonate contained in the coating on the surface as low as possible.

As shown in Table 2, the copper fine particles produced in Examples 1 to 11 contains 6.2% by mass to 29.8% by mass of copper carbonate in the coating film on the surface, and the sintering temperature is 120° C. to 200° C. which is lower than that of the conventional copper fine particles. In particular, it is also clear from the data in Table 2 that the sintering temperature can be suppressed to be a lower value when the amount of copper carbonate is lower.

Examples 12 to 16

In Examples 12 to 16, the copper fine particles P were produced using the producing apparatus 50 shown in FIG. 1 under the conditions shown in Table 3 below in the same manner as in Example 1. Moreover, the copper fine particles P were produced under different conditions and procedures in Examples 12 to 16 from those of Examples 1 to 11 in that the post-heating processing (post-processing step) was performed to the collected copper fine particles P (exhaust gas D) while supplying an inert gas (not shown) for post-processing using a batch-type heat processing apparatus (post-heating processing unit) equipped with a heater not shown in figures, which is a separate facility.

Specifically, in Examples 12 to 16, the copper fine particles P were produced using the producing apparatus 50 under the same conditions as in Examples 1 to 5 above, and the copper fine particles produced were heat treated (post-processing step) in an inert gas atmosphere in the processing furnace of the post-heating processing unit. This heating processing was performed at a temperature of 300° C. for 3 hours in a nitrogen atmosphere which is an inert gas.

Subsequently, the copper fine particles subjected to the post-processing under the above conditions were sintered under the same conditions and procedures as in Examples 1 to 5. Then, in the same manner as described above, the specific resistance of the obtained sintered body was measured by the four-terminal method, and the temperature at which this specific resistance became 100 μΩ·cm or less was denoted as the sintering temperature of the copper fine particles.

Table 3 below shows the copper fine particle formation conditions, physical properties of the obtained copper fine particles, and sintering temperatures (including specific resistance) in Examples 12 to 16.

propane as the fuel gas supplied to the burner is compared with Example 12 (Table 3) in which the copper fine particles obtained in Example 1 was subjected to the post-processing.

The copper fine particles produced in Example 1 and Example 12 were subjected to XPS analysis, and copper carbonate in the coating film on the surface was compared with 24.0% by mass (Example 1) and 11.7% by mass (Example 12). It can be understood that the concentration of copper carbonate can be further reduced by post-processing with an inert gas.

Similarly, when the Examples 1 to 5 (Table 2) are compared with Examples 12 to 16 (Table 3) in which the copper fine particles were subjected to the post-processing, the concentration of copper carbonate is reduced by about 50% in Examples 12 to 16 as compared with Examples 1 to 5. Furthermore, in Examples 12 to 16, it can be confirmed that the sintering temperature can be lowered by about 10° C. to 30° C.

TABLE 3

| | Production conditions | | | |
|---|---|---|---|---|
| | Fuel gas | C element concentration in fuel gas atom % | Cooling gas | Oxygen ratio |
| Example 12 | propane | 27.27 | air | 0.9 |
| Example 13 | methane + 50% hydrogen | 8.59 | air | 0.9 |
| Example 14 | methane + 75% hydrogen | 4.01 | air | 0.9 |
| Example 15 | methane | 20.00 | air | 0.9 |
| Example 16 | methane | 20.00 | air | 0.9 |

| | | | Coating film sintering conditions | | | | | |
|---|---|---|---|---|---|---|---|---|
| | | | Carbon concentration | Mass fraction of carbon/specific surface | XPS analysis | | Coating film sintering conditions | |
| | Specific surface area (SSA) $m^2/g$ | Average particle diameter nm | (C element concentration) % by mass | area of copper fine particles (C/SSA) mass · $g/m^2$ | Copper carbonate ($CuCO_3$) % by mass | Cuprous oxide ($Cu_2O$) % by mass | Sintering temperature ° C. | Specific resistance μΩ · cm |
| Example 12 | 6.098 | 111 | 0.085 | 0.0139 | 11.7 | 88.3 | 150 | 65 |
| Example 13 | 5.875 | 115 | 0.036 | 0.0061 | 9.1 | 90.9 | 140 | 79 |
| Example 14 | 5.954 | 113 | 0.033 | 0.0055 | 7.9 | 92.1 | 130 | 70 |
| Example 15 | 5.988 | 113 | 0.068 | 0.0113 | 10.7 | 89.3 | 140 | 91 |
| Example 16 | 11.650 | 58 | 0.094 | 0.0081 | 8.6 | 91.4 | 140 | 76 |

Figure 9:
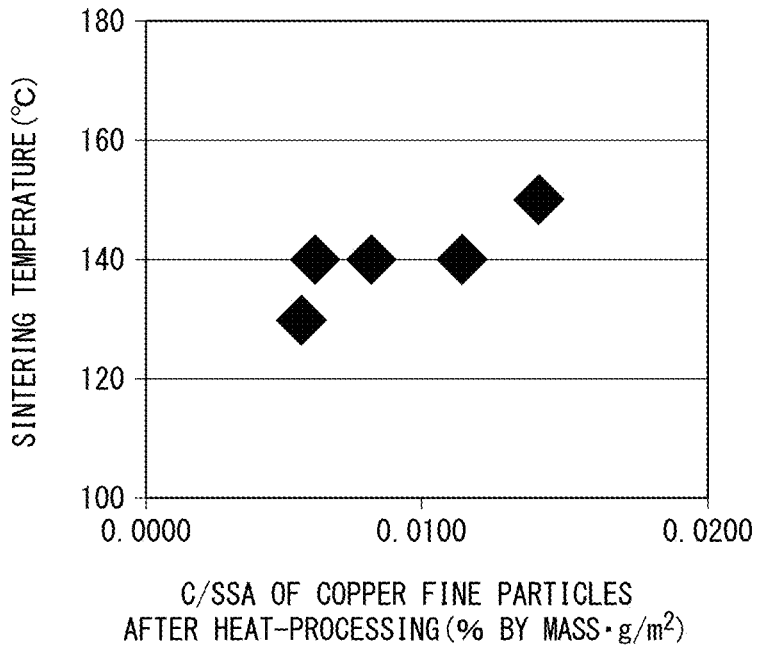
FIG. 9 is a graph showing a relationship between the sintering temperature and the ratio (C/SSA) of the mass fraction of carbon to the specific surface area of heat-treated copper fine particles when sintering heat-treated copper fine particles in Example.

FIG. 9 shows the relationship between the sintering temperature when sintering the copper fine particles subjected to post-processing (heating processing) and the ratio (C/SSA) of the mass fraction of carbon to the specific surface area of the copper fine particles subjected to post-processing (heating processing) in Examples 12 to 16. As shown in FIG. 9, even in the case of the copper fine particles subjected to the post-processing, since the sintering temperature decreases as the C/SSA decreases, it is confirmed that the sintering temperature can be controlled by adjusting the C/SSA.

As shown in Table 3, the coating film on the surface of the copper fine particles obtained in Examples 12 to 16 contains 7.9% by mass to 11.7% by mass of copper carbonate, and the sintering temperature is in a range of 130° C. to 150° C. which is lower than the sintering temperature of the conventional copper fine particles.

<Comparison with or without Post-Processing>

Example 1 (Table 2) in which the copper fine particles were produced by setting the oxygen ratio to 0.9 using

INDUSTRIAL APPLICABILITY

According to the copper fine particles of the present invention, since the coating film on the surface of the copper fine particles contains cuprous oxide and copper carbonate, it possible to suppress the sintering temperature of the copper fine particles to be a low level. As a result, it is possible to sinter the copper fine particles at a lower temperature than that of the conventional copper fine particles without causing an increase in producing cost, a decrease in productivity, or the like. Therefore, for example, the copper fine particles of the present invention can be used for high density wiring and the like on the surface of the resin substrate with low heat resistance, and are suitably used in electronic devices, printed wiring boards and the like.

EXPLANATION OF REFERENCE NUMERAL

1 fuel supply unit
2 feeder
3 burner 31 raw material ejection flow channel
32 primary oxygen ejection flow channel
33 secondary oxygen supply flow passage
34 water cooling jacket
4 combustion supporting gas supply unit
6 water cooling furnace
7 first cooling gas supply unit
8 bag filter
9 recovery unit
10 blower
11 second cooling gas supply unit
50 producing apparatus
G1 fuel gas
G2 combustion supporting gas
G3 first cooling gas
G4 second cooling gas
G5 combustion exhaust gas
M powder raw material (copper or copper compound (metal compound))
P copper fine particles
D exhaust gas (gas containing copper fine particles and combustion exhaust gas)

The invention claimed is:

1. Copper particles having a coating film on the surface thereof,
wherein a ratio (C/SSA) of a mass fraction of carbon to a specific surface area of the copper particles is in a range of 0.008% by mass·g/m$^2$ to 0.020% by mass·g/m$^2$,
wherein the copper particles are capable of being sintered in a temperature range of 120° C. to 150° C., and
wherein the coating film consists essentially of cuprous oxide and copper carbonate.

2. The copper particles according to claim 1, wherein an amount of the copper carbonate in the coating film is more than 0% by mass and 20% by mass or less.

3. A method for producing the copper particles according to claim 1 in which the copper particles have a coating film containing cuprous oxide and copper carbonate on the surface thereof and are produced by heating copper or a copper compound in a reducing flame formed in a furnace by a burner,
wherein the method includes a heating step in which the copper particles are produced while controlling a ratio (C/SSA) of a mass fraction of carbon to a specific surface area of the copper particles by adjusting an amount of carbon in fuel gas supplied to the burner.

4. The method for producing copper particles according to claim 3, wherein the method further includes a cooling step in which the copper particles produced in the heating step are cooled in an inert gas atmosphere.

5. The method for producing copper particles according to claim 4, wherein the method further includes a post-processing step in which the copper particles cooled in the cooling step are heated in an inert gas atmosphere.

6. A sintered body in which the copper particles according to claim 1 are sintered.

7. A sintered body in which the copper particles according to claim 2 are sintered.

* * * * *